United States Patent
Betz

(10) Patent No.: US 6,176,086 B1
(45) Date of Patent: Jan. 23, 2001

(54) HYDROSTATIC TRANSMISSION IN ONE HOUSING

(75) Inventor: Michael A. Betz, Huxley, IA (US)

(73) Assignee: Sauer Inc., Ames, IA (US)

( * ) Notice: Under 35 U.S.C. 154(b), the term of this patent shall be extended for 0 days.

(21) Appl. No.: 09/209,393

(22) Filed: Dec. 10, 1998

(51) Int. Cl.$^7$ .................................................. F16D 39/00
(52) U.S. Cl. ............................................................ 60/487
(58) Field of Search ............................ 60/487, 488, 489, 60/490

(56) References Cited

U.S. PATENT DOCUMENTS

| 1,545,678 | * | 7/1925 | Miller ...................................... 60/487 |
| 1,648,000 | * | 11/1927 | Lee .......................................... 60/465 |
| 2,633,710 | * | 4/1953 | Jarmann, Jr. ............................. 60/487 |
| 2,720,843 | * | 10/1955 | Morsey ............................... 60/487 X |
| 2,844,002 | * | 7/1958 | Pavesi ................................ 60/487 X |
| 3,126,707 |   | 3/1964 | Hann et al. . |
| 3,131,539 | * | 5/1964 | Creighton et al. ...................... 60/487 |
| 3,133,418 | * | 5/1964 | Froebe ...................................... 60/487 |
| 3,177,666 |   | 4/1965 | Reinke . |
| 3,309,870 |   | 3/1967 | Pinkerton . |
| 3,751,924 | * | 8/1973 | Brown et al. ........................... 60/485 |
| 3,903,978 |   | 9/1975 | Kraus . |
| 4,075,843 | * | 2/1978 | Leker ...................................... 60/487 |
| 4,137,717 | * | 2/1979 | Forster ................................... 60/487 |
| 4,531,365 | * | 7/1985 | Wanie ................................ 60/487 X |
| 4,534,271 |   | 8/1985 | Forster . |
| 4,616,478 | * | 10/1986 | Jensen ................................... 60/487 |
| 4,624,175 | * | 11/1986 | Wahlmark ......................... 60/487 X |
| 4,843,817 | * | 7/1989 | Shivvers et al. ....................... 60/487 |
| 4,845,949 | * | 7/1989 | Shivvers et al. ................... 60/487 X |
| 4,896,506 | * | 1/1990 | Shivvers et al. ........................ 60/487 |
| 5,203,169 | * | 4/1993 | Ishii et al. ............................... 60/487 |
| 5,247,794 | * | 9/1993 | Benson et al. .......................... 60/487 |
| 5,307,731 |   | 5/1994 | Chamberlain et al. ................. 92/147 |
| 5,406,794 |   | 4/1995 | Litz . |
| 5,540,563 |   | 7/1996 | Hansell ................................ 417/269 |
| 5,800,134 |   | 9/1998 | Hasegawa et al. . |

FOREIGN PATENT DOCUMENTS

| 50-33283 | 10/1975 | (JP) . |
| 1-223023 | 9/1989 | (JP) . |
| 6-17433 | 3/1994 | (JP) . |

* cited by examiner

Primary Examiner—John E. Ryznic
(74) Attorney, Agent, or Firm—Zarley, McKee, Thomte, Voorhees & Sease

(57) ABSTRACT

A hydrostatic transmission includes a hollow one-piece cast housing having an internal compartment and an outer shell with opposite sides and opposite ends; a central wall in the housing dividing the compartment into separate sub-compartments and being integrally cast with the housing; first and second hydrostatic power units mounted one each in the sub-compartments on opposite sides of the central wall; and high pressure fluid conduits extending through the central wall and hydraulically connecting the hydrostatic power units. The hydrostatic power units can include a pump and a motor, each having respective rotating groups which are easily insertable into the respective sub-compartments through access openings in the housing. Although the main shafts of the pump and motor are capable of rotating in different directions from each other and at different speeds, the shafts have axes of rotation which are coincidental to each other.

18 Claims, 8 Drawing Sheets

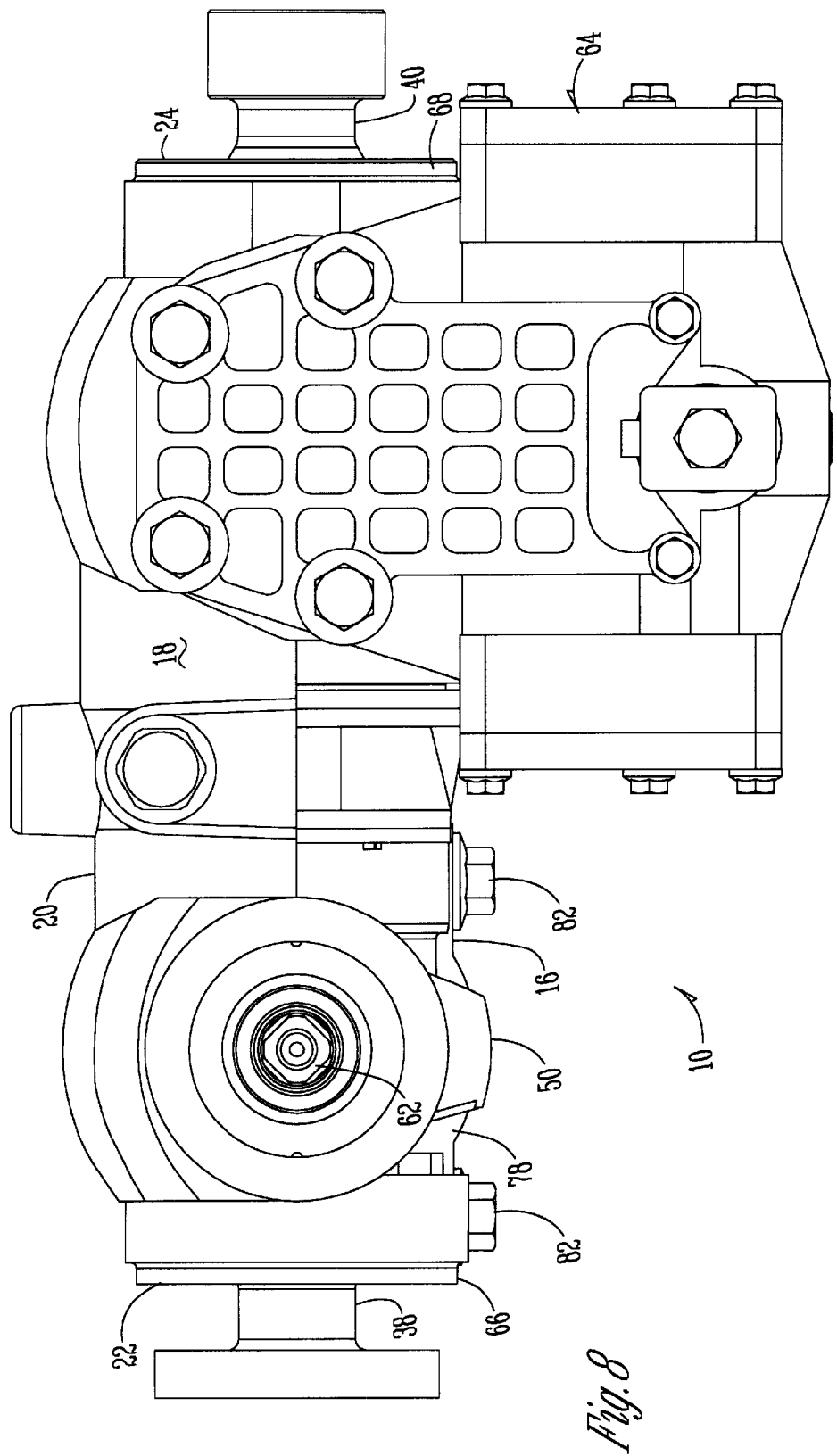

HYDROSTATIC TRANSMISSION IN ONE HOUSING

BACKGROUND OF THE INVENTION

The present invention relates to the field of hydraulic transmissions. More particularly, this invention relates to a hydrostatic transmission which includes a pump and motor which are both disposed in one housing. Such a hydrostatic transmission provides considerable cost savings and reliability enhancements.

In U.S. Pat. No. 5,307,731, Chamberlain, et al., disclose a unitary housing system for hydraulic units. The housing is a single-cast, unitary, hollow housing which has a continuous sidewall extending between opposing forward and rearward walls to form an enclosed housing. The rotary axis extends longitudinally between the forward and rearward walls and is generally centered in an opening formed in the forward wall. Access openings are provided in the continuous sidewall transverse to the rotary axis for installation of the rotating group and other components during assembly. This housing system was developed to eliminate housing component joints along a path of major hydraulic separating forces. The housing system also eliminates fastening systems which would have been required along such joints.

The unitary housing concept was taken one step farther by Hansell in U.S. Pat. No. 5,540,563. Hansell discloses a unitary housing for a tandem pump. The unitary housing disclosed has a continuous sidewall connecting the end walls and at least tow apertures in the sidewall which allow insertion of rotating groups into the housing. Different mounting flanges can be provided at either end of the tandem pump. FIG. 5 of the U.S. Pat. No. 5,540,563 discloses that the two pump shafts are mechanically connected to each other by a coupling. Furthermore, no high pressure passages interconnect the two pumps through the center section. Each pump basically has its own separate, internal hydraulic system. The two pumps merely share a common input shaft or source of rotary power.

Despite these advances in eliminating troublesome joints and fasteners in hydraulic units, the above references fail to disclose how a unitary housing concept can be applied to a complete hydraulic or hydrostatic transmission which includes a pump and a motor fluidly connected together by high pressure passages. Conventionally, high pressure passages have typically been provided by external high pressure hoses which fluidly interconnect separately housed pumps and motors together. While it is known to combine pumps and motors together in a single package, such packages include more than one housing or include a housing which is split transversely to the axial forces generated by the unit. This arrangement causes reliability problems relating to the joints and fasteners, as discussed in the two patents mentioned above. Therefore, there is a need for a hydrostatic transmission, pump and motor, disposed in a single, unitary housing which lacks any troublesome transverse joints and associated fasteners.

Thus, a primary objective of the present invention is the provision of a hydrostatic transmission which includes a pump and motor disposed in a single, unitary housing.

A further objective of the present invention is the provision of a hydrostatic transmission disposed in one housing so as to provide a short package length.

A further objective of the present invention is the provision of a hydrostatic transmission in a single housing which has a porting web with high pressure passages extending therethrough.

A further objective of the present invention is the provision of a hydrostatic transmission that has a reduced number of fasteners and joints and thereby fewer opportunities for joint-related defects.

A further objective of the present invention is the provision of a hydrostatic transmission which has fewer components to machine and assemble.

A further objective of the present invention is the provision of a hydrostatic transmission which can be fabricated with fewer machining operations.

A further objective of the present invention is the provision of a hydrostatic transmission which has fewer fastener torquing operations during its assembly process.

A further objective of the present invention is the provision of a hydrostatic transmission which is easier to assemble, more economical to produce, and more reliable in use.

A further objective of the present invention is the provision of a hydrostatic transmission in which the pump and motor both have open cases such that oil is not generally retained in the housing.

A further objective of the present invention is the provision of a hydrostatic transmission having a unitary housing which incorporates side access holes for inserting the rotating groups into the housing.

A further objective of the present invention is the provision of a hydrostatic transmission in which all high pressure hydraulic connections are internal to the housing.

A further objective of the present invention is the provision of an improved trunnion bearing retainer.

A further objective of the present invention is the provision of a hydrostatic transmission in which the pump and motor shafts are not mechanically coupled.

These and other objectives will be apparent from the drawings, as well as from the description and claims which follow.

SUMMARY OF THE INVENTION

The present invention relates to a hydrostatic transmission which includes a hollow one-piece cast housing having an internal compartment and an outer shell with opposite sides and opposite ends; a central wall in the housing dividing the compartment into separate sub-compartments and being integrally cast with the housing; first and second hydrostatic power units mounted one each in the sub-compartments on opposite sides of the central wall; and high pressure fluid conduits extending through the central wall and hydraulically connecting the hydrostatic power units.

The hydrostatic power units can include a pump and a motor, each having respective rotating groups which are easily insertable into the respective sub-compartments through access openings in the housing. Although the main shafts of the pump and motor are capable of rotating in different directions from each other and at different speeds, the shafts have axes of rotation which are coincidental to each other.

BRIEF DESCRIPTION OF THE DRAWINGS

FIG. 8 is a rear elevation view of the hydrostatic transmission of FIG. 1.

DETAILED DESCRIPTION OF THE PREFERRED EMBODIMENT

Figure 1:
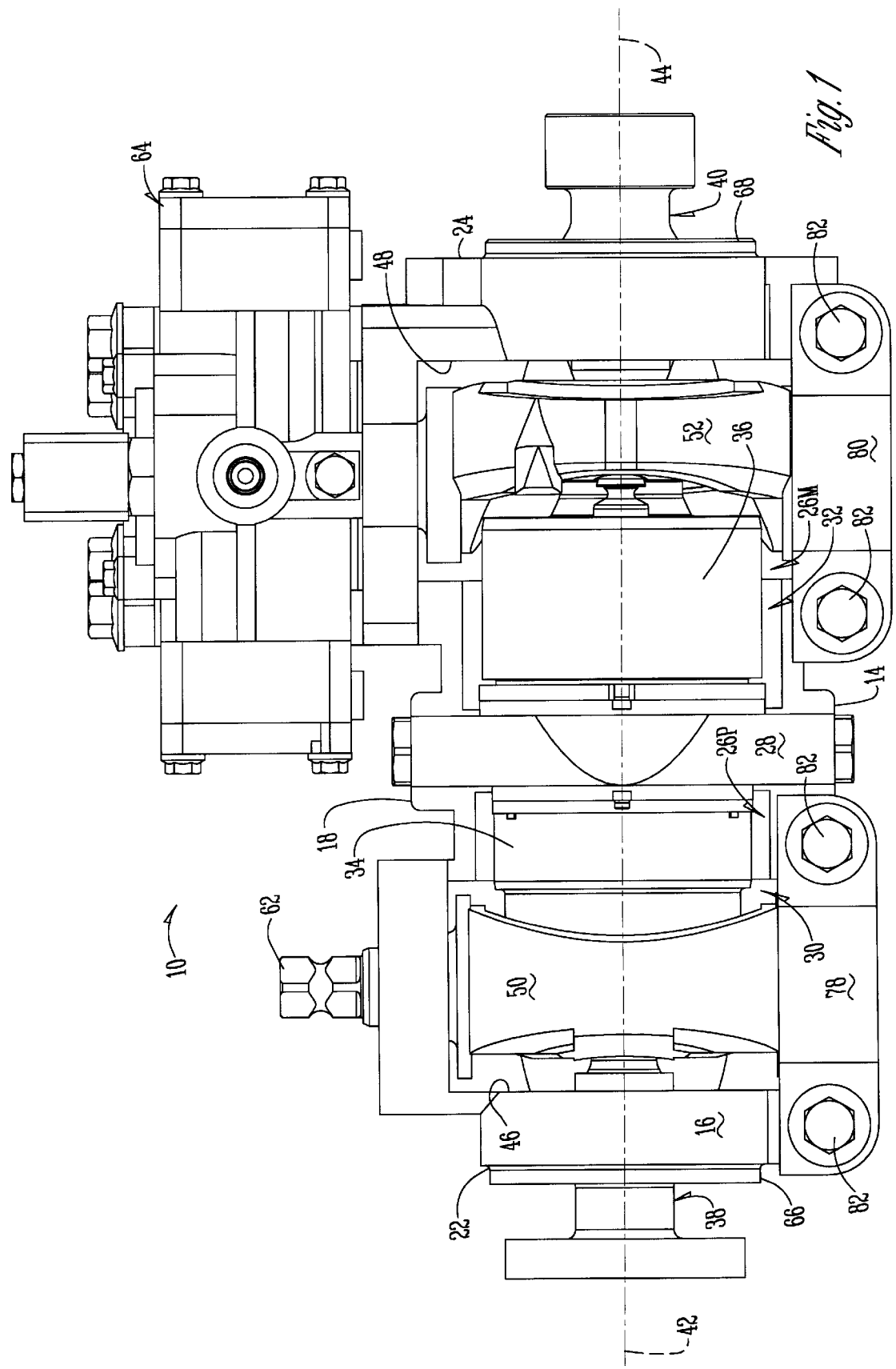
FIG. 1 is a top plan view of the hydrostatic transmission of this invention.
Figure 2:
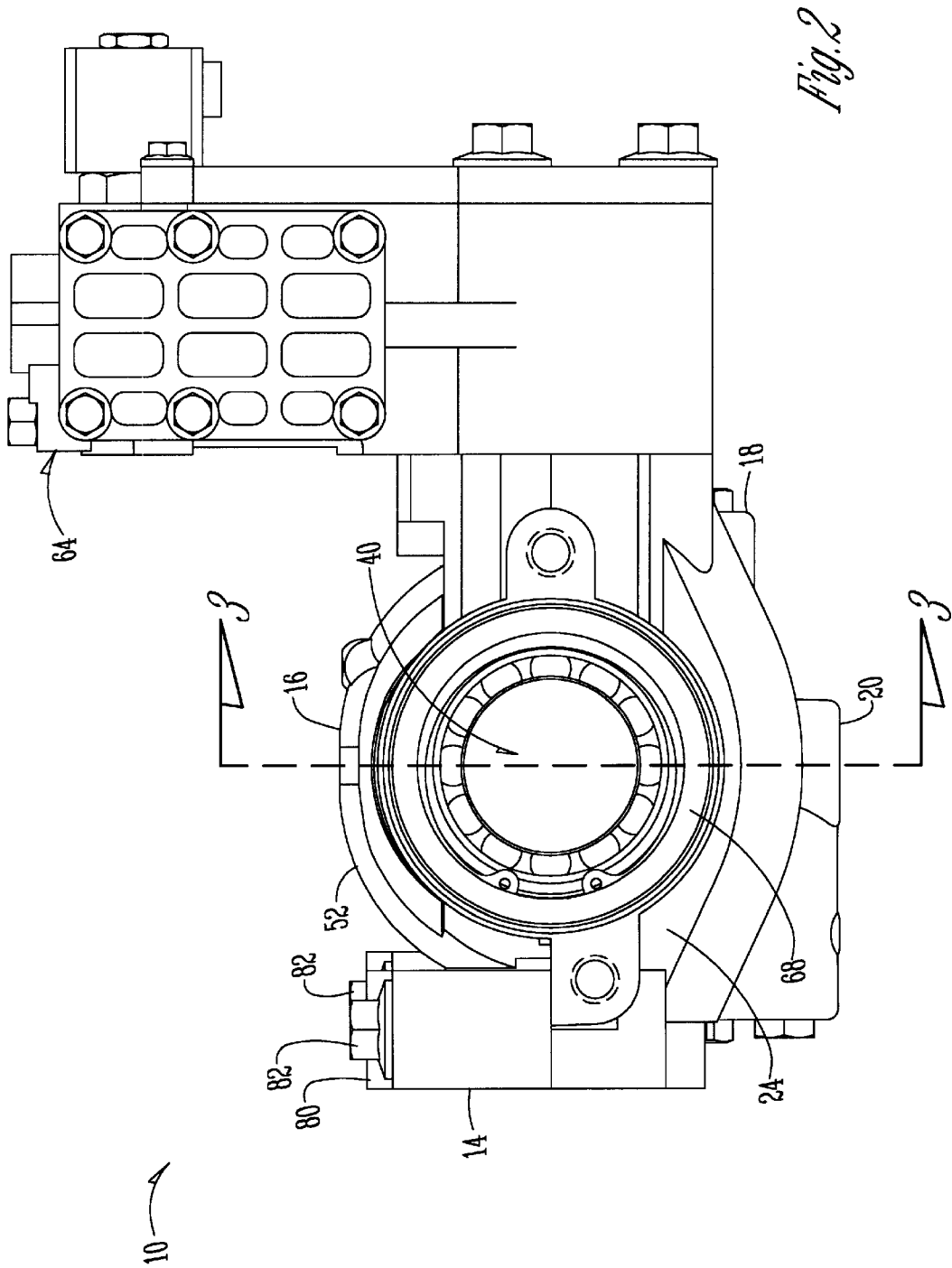
FIG. 2 is a right end elevation view of the hydrostatic transmission of FIG. 1.
Figure 3:
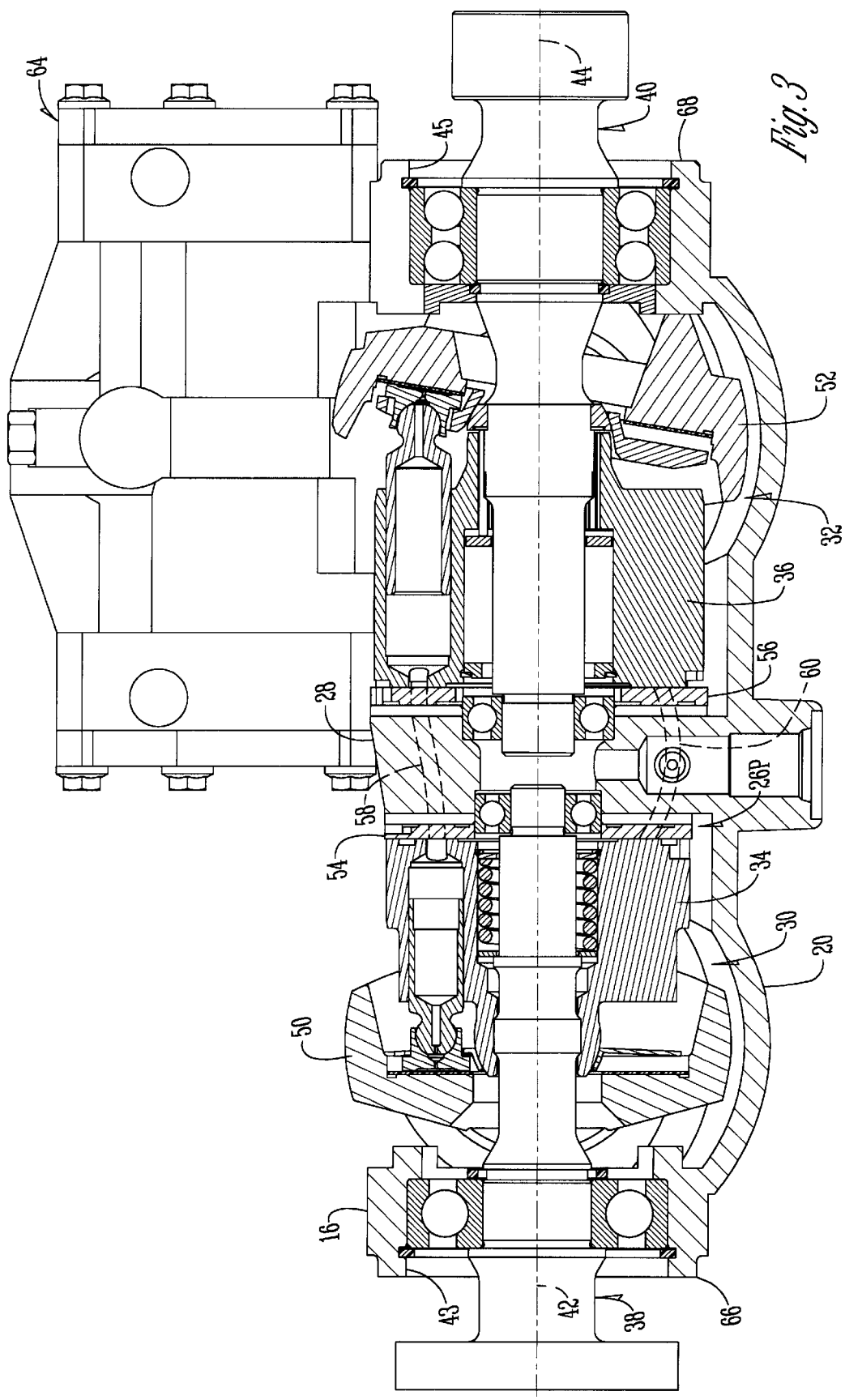
FIG. 3 is a longitudinal cross-sectional view of the hydrostatic transmission taken along line 3—3 in FIG. 2.
Figure 4:
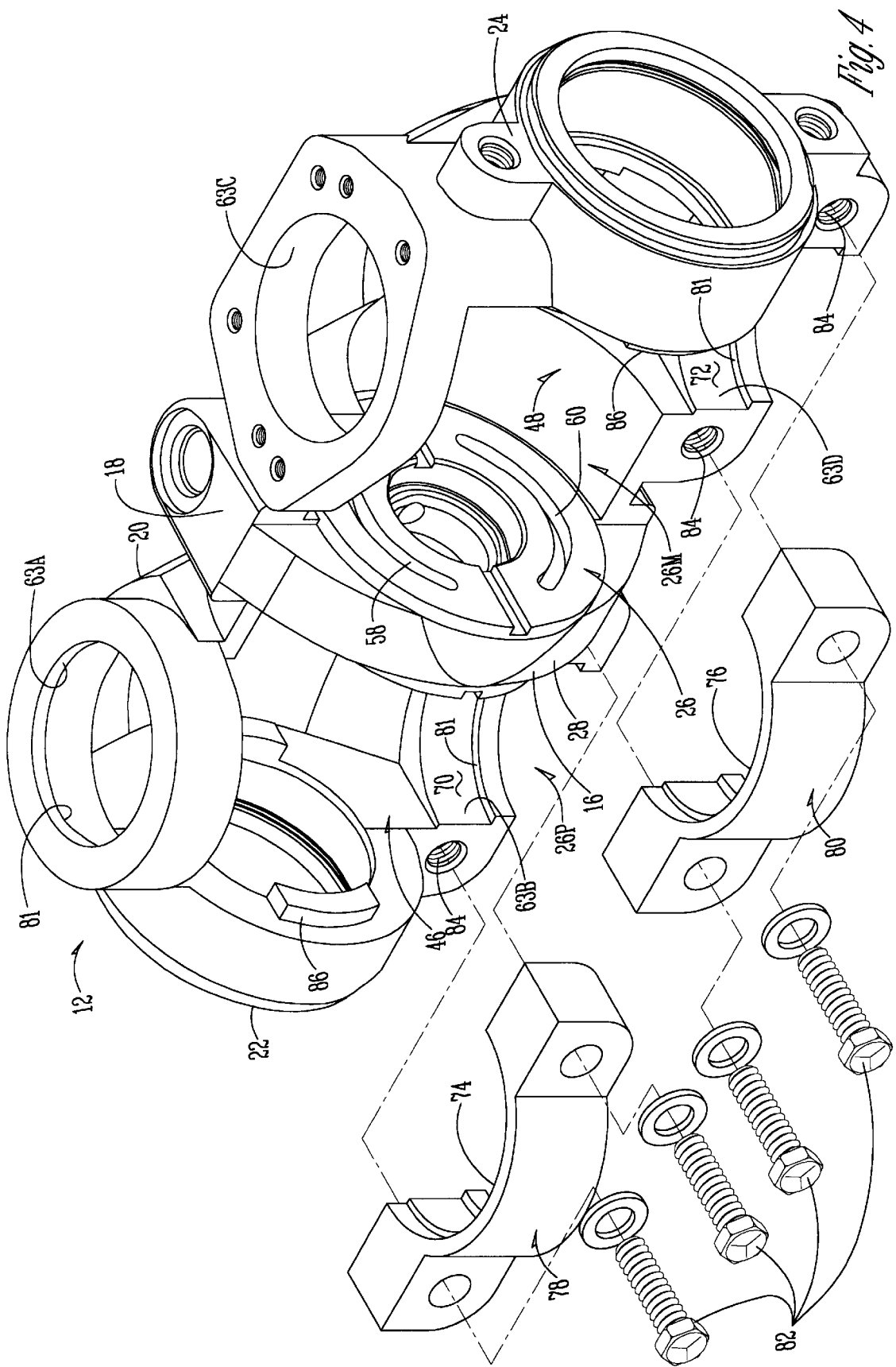
FIG. 4 is an exploded perspective assembly view of the transmission housing for the present invention.
Figure 5:
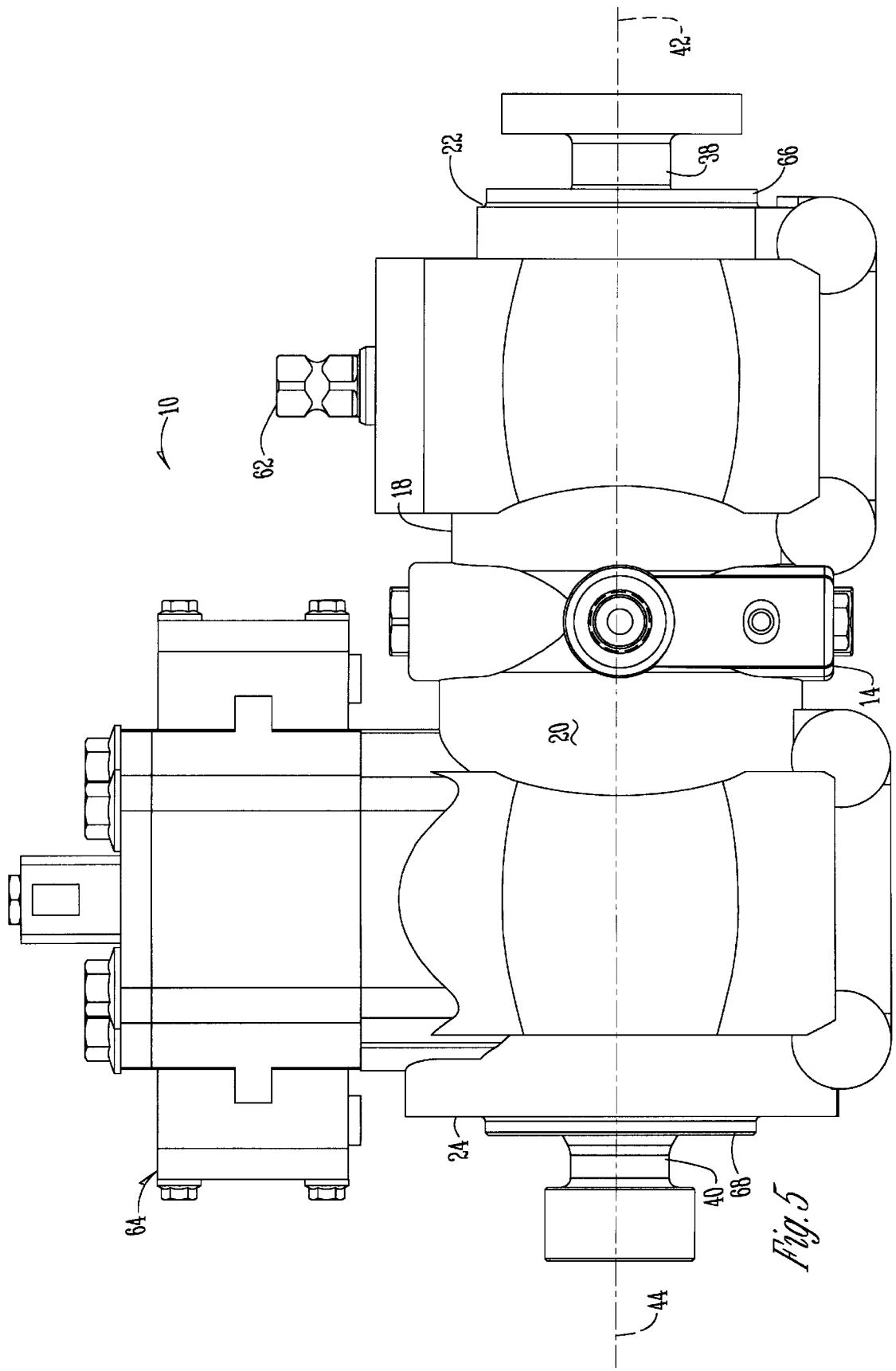
FIG. 5 is a bottom plan view of the hydrostatic transmission of FIG. 1.
Figure 6:
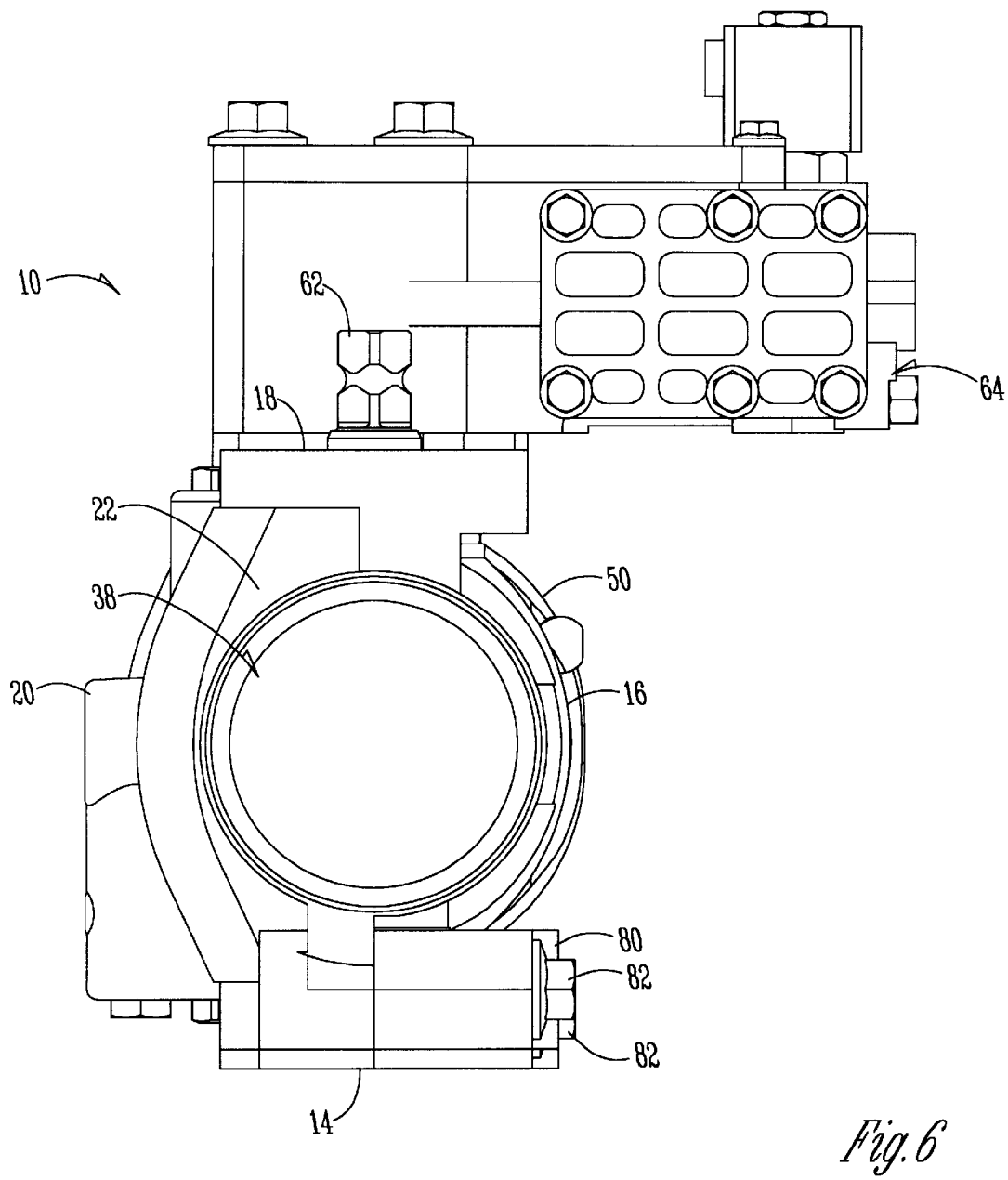
FIG. 6 is a left end elevation view of the hydrostatic transmission of FIG. 1.
Figure 7:
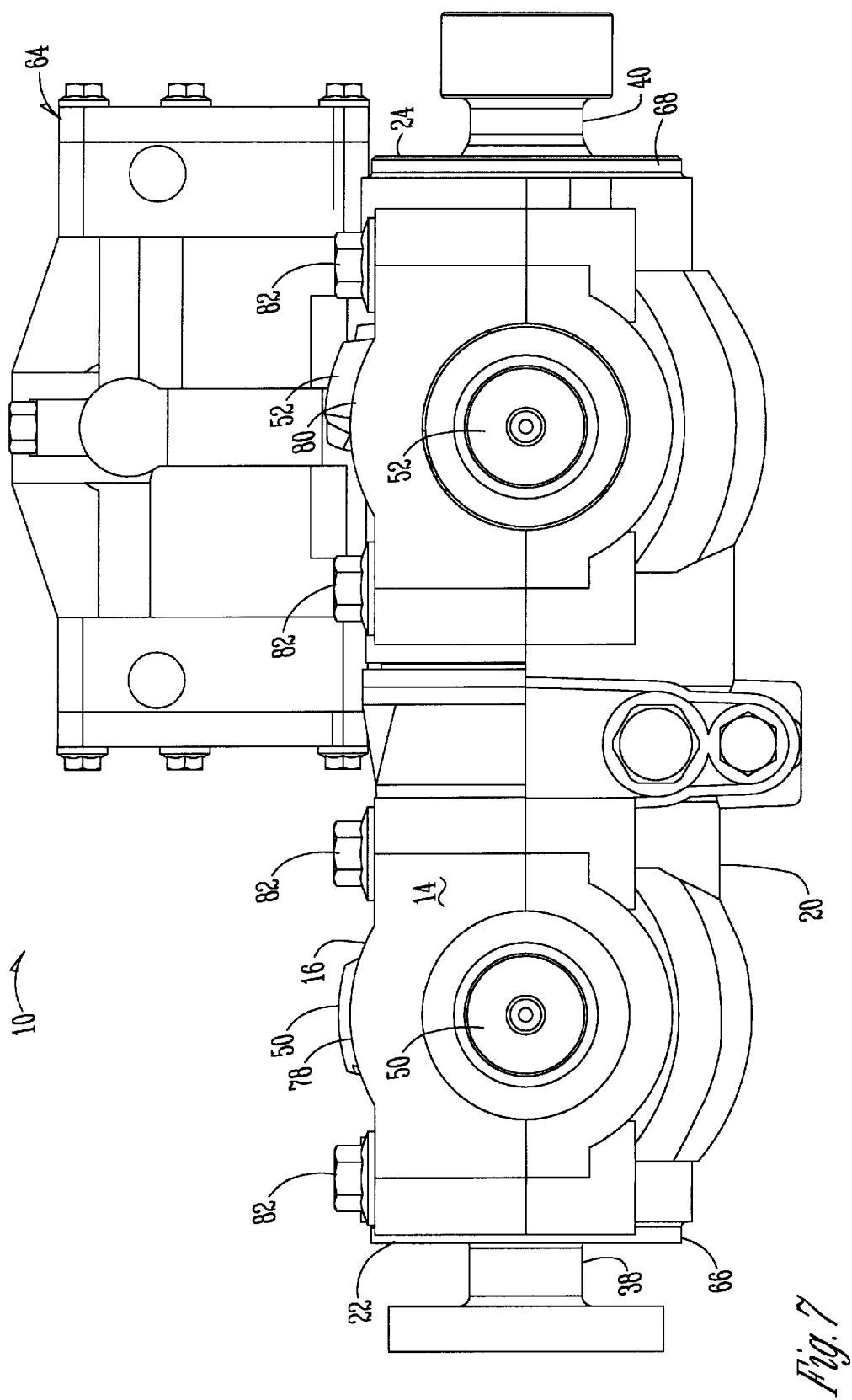
FIG. 7 is a front elevation view of the hydrostatic transmission of FIG. 1.

The hydrostatic transmission of the invention is generally designated by the reference numeral 10 in the figures. FIGS. 1–8 show that the transmission 10 includes a hollow one-piece cast housing 12 (FIG. 4) which has an outer shell with generally opposite sides 14–20 (FIGS. 1, 2 and 4) and opposite ends 22, 24 defining an internal compartment 26. As best seen in FIGS. 1 and 4, a central wall or porting web 28 divides the compartment 26P, 26M. The web 28 is integrally cast with the housing 12.

A hydrostatic pump 30, mounts in sub-compartment 26P, while another hydrostatic power unit, such as a hydrostatic motor 32, mounts in sub-compartment 26M. Each of the hydrostatic power units 30, 32 has its own respective rotating group 34, 36 of conventional axial piston construction. Referring to FIG. 3, the rotating groups 34, 36 include rotatable main shafts 38, 40 which are mechanically separate and preferably spaced apart from each other such that they are capable of rotating in different directions and at different speeds. The pump shaft 38 and the motor shaft 40 each have a central axis of rotation 42, 44 which is coincident with the other axis of rotation 44, 42. Thus, the pump 30 and motor 32 are in an "in-line" configuration. The pump shaft 38 extends through an opening 43 in the end 22. The motor shaft 40 extends through an opening 45 in the end 24 of the housing 12. See FIGS. 1 and 4.

Access openings 46, 48 extend through one side, preferably the top side 16, of the housing 12 to allow for the insertion of the respective rotating groups 34, 36 into the sub-compartment 26P, 26M during the assembly process. The pump swashplate 50 and motor swashplate 52 can also be inserted into the unit through the access openings 46, 48. The access openings 46, 48 have a further advantage in that they permit the oil or hydraulic fluid to overflow or drain out the top of the housing 12 so as to provide an "open case" unit. Optionally, cover plates can be sealingly mounted over the openings 46, 48 if a "closed case" unit is desired.

In FIG. 3, the rotating groups 34, 36, which are not themselves the subject of this invention, include a cylinder block with a plurality of piston assemblies axially movable therein. Conventional valve plates 54, 56 control the flow of high pressure fluid through the central wall or porting web 28. One or more high pressure passages 58, 60 extend through the porting web 28 so as to connect the internal high pressure ports in the pump 30 with the internal high pressure ports in the motor 32. Thus, the pump 30 and the motor 32 are connected by the high pressure passages 58, 60 in a closed circuit.

Operatively associated with the rotating groups 34, 36 are swashplates 50, 52 respectively. As best seen in FIG. 1, the pump swashplate 50 has a handle portion 62 which extends outside of the housing 12 through a trunnion opening 63A below the access opening 46. The swashplate 50 is of the type generally referred to as a "manual control" or pintle shaft, but servo assisted control mechanisms can also be mounted on or connected to the handle portion 62. The handle portion 62 provides direct mechanical control of the swashplate 50, which is tiltable to vary the stroke of the piston assemblies in the pump rotating group 34. Thus, the stroke or fluid displacement of the piston assemblies in the rotating cylinder block is easily and precisely controllable.

In the figures, the motor 32 includes a swashplate 52 which is movable or preferably tiltable with respect to the trunnion axis rotating group 36. Motors equipped with such swashplates are typically referred to in the art as "variable motors." In the preferred embodiment, the motor swashplate 52 is controlled hydraulically by a servo motor displacement control 64 mounted on the housing 12. Other swashplate and control configurations are contemplated. For instance, the motor 32 could have a swashplate which is fixed with respect to the rotating group. Such motors are typically referred to as "fixed motors."

The ends 22 and 24 of the housing 12 have mounting flanges formed thereon. For optimum flexibility in mounting the transmission 10 in a vehicle (not shown), it is preferred that the flanges 66, 68 be substantially identical in the dimensions which they present for mounting purposes. However, the flanges 66, 68 can also be formed to meet different standards and mismatched accordingly. For instance, both the pump mounting pad or flange 66 and the motor mounting pad or flange 68 are shown in the figures to have an S.A.E. (Society of Automotive Engineers) B configuration. However, the motor flange 68 can have a S.A.E. C configuration, while the pump flange 66 has a S.A.E. B configuration.

The access openings 46, 48 and the trunnion openings 63A, 63B, 63C, 63D allow the rotating groups 34, 36 and the swashplates 50, 52 to be easily inserted into the housing 12 and removed therefrom. The trunnion openings 63B, 63 are cylindrical openings respectively defined by a lower semi-cylindrical surface 70, 72 and a corresponding upper semi-cylindrical surface 74, 76 registered therewith provided on a cap member 78, 80. The upper surfaces 74, 76 can be integrally formed in the housing 12 or can be located in the cap members 78, 80 which are fastened to the housing 12 by fastening means, such as bolts 82 insertable into threaded holes 84 in the housing. The use of detachably mounted cap members 78, 80 generally results in a more compact housing 12 and is therefore preferred.

During assembly, the swashplates 50, 52 are placed on top of their respective rotating groups 34, 36, then inserted into the access openings 46, 48. The assembler inserts the handle 62 of the pump swashplate 50 through the trunnion opening 63A as shown in FIGS. 1 and 8. Similarly, a portion of the trunnion diameter of the motor swashplate 52 must be positioned so as to be rotatably journaled in the portion of the housing 12 surrounding the trunnion opening 63C. The opposite ends of the swashplates 50, 52 are lowered into the respective sub-compartments, 26P, 26M through the access openings 46, 48 and positioned to be supported by the surface 70, 72. The assembler then fastens the cap members 78, 80 to the housing 12 over the ends of the swashplates 50, 52 to retain them. Conventional bushings or trunnion bearings (not shown) are interposed between the trunnion diameters of the swashplates 50, 52, the housing 12, and the cap members 78, 80 to reduce the amount of friction which must be overcome to rotate or tilt the swashplates 50, 52. Lips 81 on the housing 12 and the cap member 78, 80 protrude radially inward to help retain the swashplates 50, 52. Snap rings and seals (not shown) can be used to improve the lateral stability of the swashplates 50, 52 and fluid integrity of the surrounding area, if necessary.

The assembler can then install the pump shaft 38 through the housing 12 and the swashplate 50 and drivingly engage the cylinder block of the rotating group 34. The web 28 rotatably supports the portion of the shaft 38 which extends through the rotating group 34. The motor shaft 40 installs through the rotating group 36 in a similar manner and is likewise rotatably supported in the web 28. The pump shaft 38 does not drivingly connect to the motor shaft 40.

One or more stops 86 are mounted or preferably integrally formed on the housing 12 so as to be adjacent the backside of the swashplates 50, 52 to limit the angle to which the swashplates can be tilted.

Thus, it can be seen that the present invention at least achieves it stated objectives.

In the drawings and specifications there has been set forth a preferred embodiment the invention, and although the specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention.

What is claimed is:

1. A hydrostatic transmission, comprising:
   a hollow one-piece cast housing having an internal compartment and an outer shell including opposite front, rear, top and bottom side walls and opposite end walls integrally cast together with the side walls;
   a central wall in the housing joined to all of the side walls and completely dividing the compartment into separate sub-compartments and being integrally cast with the housing;
   first and second hydrostatic power units mounted one each in the sub-compartments on opposite sides of the central wall; and
   high pressure fluid conduits extending through the central wall and hydraulically connecting the hydrostatic power units.

2. The transmission of claim 1 wherein one of said hydrostatic power units is a hydrostatic pump and the other of said hydrostatic power units is a hydrostatic motor.

3. The transmission of claim 1 wherein the hydrostatic power units each include a rotating group and access openings are located in at least one side wall of the housing and being of a size that the rotating groups of the respective hydrostatic units can be physically moved through the openings for installation purposes.

4. The transmission of claim 1 wherein the hydrostatic power units each includes a rotating group comprising a rotatable main shaft drivingly connected to the rotating group, the main shaft of the second hydrostatic power unit being separated from the main shaft of the first hydrostatic power unit such that the main shafts are capable of rotating in different directions from each other and at different speeds.

5. The transmission of claim 4 wherein the main shafts each have a central axis of rotation, one central axis of rotation being coincident with the other central axis of rotation.

6. The transmission of claim 3 wherein the first hydrostatic power unit is a pump wherein the swashplate has a handle portion thereon which extends outside the housing through a trunnion opening spaced below one of the access openings.

7. The transmission of claim 2 wherein the hydrostatic motor is a variable motor having a movable swashplate.

8. The transmission of claim 2 wherein one of the hydrostatic power units has a swashplate that is coupled with and controlled by a servo motor displacement control mounted on the housing.

9. The transmission of claim 2 wherein one of the hydrostatic power units has a movable swashplate having a control handle thereon extending outside the housing.

10. The transmission of claim 3 wherein the high pressure fluid conduits through the central wall fluidly connect the rotating groups of hydrostatic units in a closed circuit loop.

11. A hydrostatic transmission, comprising:
    a hollow one-piece cast housing having an internal compartment delimited by an outer shell with front, rear, top and bottom side walls and opposite first and second end walls integrally cast together with the side walls;
    a central wall in the housing joined to all of the side walls and completely dividing the compartment into separate sub-compartments and being integrally cast with the housing;
    a hydrostatic pump being mounted in one of the sub-compartments and a hydrostatic motor being mounted in another of the sub-compartments;
    high pressure fluid conduits extending through the central wall and hydraulically connecting the hydrostatic power units;
    the pump including a rotating group having a rotatable pump shaft with a central axis of rotation and the motor including a rotating group having a rotatable motor shaft with a central axis of rotation, the pump shaft being separate from the motor shaft; and
    the pump shaft being rotatably supported by and extending through the first end wall and the motor shaft being rotatably supported by and extending through the second end wall.

12. The transmission of claim 11 wherein the central axis of rotation of the pump shaft is coincident with the central axis of rotation of the motor shaft.

13. The transmission of claim 11 wherein the pump shaft is spaced from the motor shaft in an axial direction.

14. A housing for a hydrostatic transmission, comprising:
    first and second generally opposite end walls, the first end wall having an opening therethrough adapted to allow an input drive shaft to be extended from the housing, the second end wall having an opening therethrough adapted to allow an output shaft to be extended from the housing;
    an elongated continuous side wall interconnecting the end walls, the side wall front, rear, top and bottom sections and having an integrally formed generally transverse intermediate wall portion joined to all of the sectios and completely dividing the housing into first and second sub-compartments;
    first and second access openings extending through the side wall into the first and second sub-compartments respectively and being adapted to allow insertion of first and second rotating groups of the hydrostatic transmission; and
    a pair of high pressure fluid conduits extending completely through the intermediate wall portion and between the first and second sub-compartments.

15. The housing of claim 14 wherein the side wall has a top, bottom, and opposite sides, the first and second access openings extending through the top section of the side wall.

16. The housing of claim 15 wherein a plurality of trunnion openings adapted to receive swashplate trunnions are formed in the front and rear sections of the side wall adjacent each of the first and second sub-compartments.

17. The housing of claim 16 wherein the trunnion openings overlap with the access openings to define a gap therebetween, and detachably mounted cap members are mounted to the housing to fill the gap.

18. A hydrostatic transmission, comprising:

a hollow one-piece cast housing having an internal compartment and an outer shell with opposite front, rear, top and bottom sides and opposite ends;

a central wall in the housing joined to all of the sides and completely dividing the compartment into separate sub-compartments and being integrally cast with the housing;

first and second hydrostatic power units mounted one each in the sub-compartments on opposite sides of the central wall; and high pressure fluid conduits extending through the central wall and hydraulically connecting the hydrostatic power units;

wherein the hydrostatic power units each include a rotating group and access openings are located in at least one side of the housing and being of a size that the rotating groups of the respective hydrostatic units can be physically moved through the openings for installation purposes.

* * * * *

UNITED STATES PATENT AND TRADEMARK OFFICE
CERTIFICATE OF CORRECTION

PATENT NO. : 6,176,086 B1
DATED : January 23, 2001
INVENTOR(S) : Michael A. Betz It is certified that error appears in the above-identified patent and that said Letters Patent is hereby corrected as shown below:

Column 5,
Line 63, strike the numeral "3" and insert the numeral -- 18 --.

Column 6,
Line 10, strike the numeral "3" and insert the numeral -- 18 --.

Column 6,
Lines 65, 66, and 67 should read as follows:
-- 15. The housing of claim 14 wherein the first and second access openings extending through the top section of the side wall. --

Signed and Sealed this

Twenty-third Day of October, 2001

Attest:

*Attesting Officer*

NICHOLAS P. GODICI
*Acting Director of the United States Patent and Trademark Office*